United States Patent [19]
Young

[11] 3,965,395
[45] June 22, 1976

[54] POWER INTERRUPTER FOR ELECTRICAL DEVICES

[75] Inventor: Danny J. Young, Tyler, Tex.

[73] Assignee: James W. Fair, Tyler, Tex. ; a part interest

[22] Filed: July 2, 1975

[21] Appl. No.: 592,660

[52] U.S. Cl. .............................. 317/18 R; 340/255
[51] Int. Cl.² ......................................... H02H 1/02
[58] Field of Search ................ 317/9 R, 9 A, 9 AC, 317/18 R, 18 A, 18 D; 340/255

[56] References Cited
UNITED STATES PATENTS

| | | |
|---|---|---|
| 2,275,883 | 3/1942 | Bany .................................. 340/255 |
| 3,340,433 | 9/1967 | Almquist ........................... 317/18 R |
| 3,386,004 | 5/1968 | Dwyer ............................... 317/18 R |

*Primary Examiner*—J. D. Miller
*Assistant Examiner*—Harry E. Moose, Jr.
*Attorney, Agent, or Firm*—Cushman, Darby & Cushman

[57] ABSTRACT

A device for normally supplying electrical power from a power source to an electrical device having a working portion which may come into contact with a grounded metal object during its operation and for automatically interrupting such power supply to the device whenever the working portion of the device actually does contact the grounded metal object.

10 Claims, 1 Drawing Figure

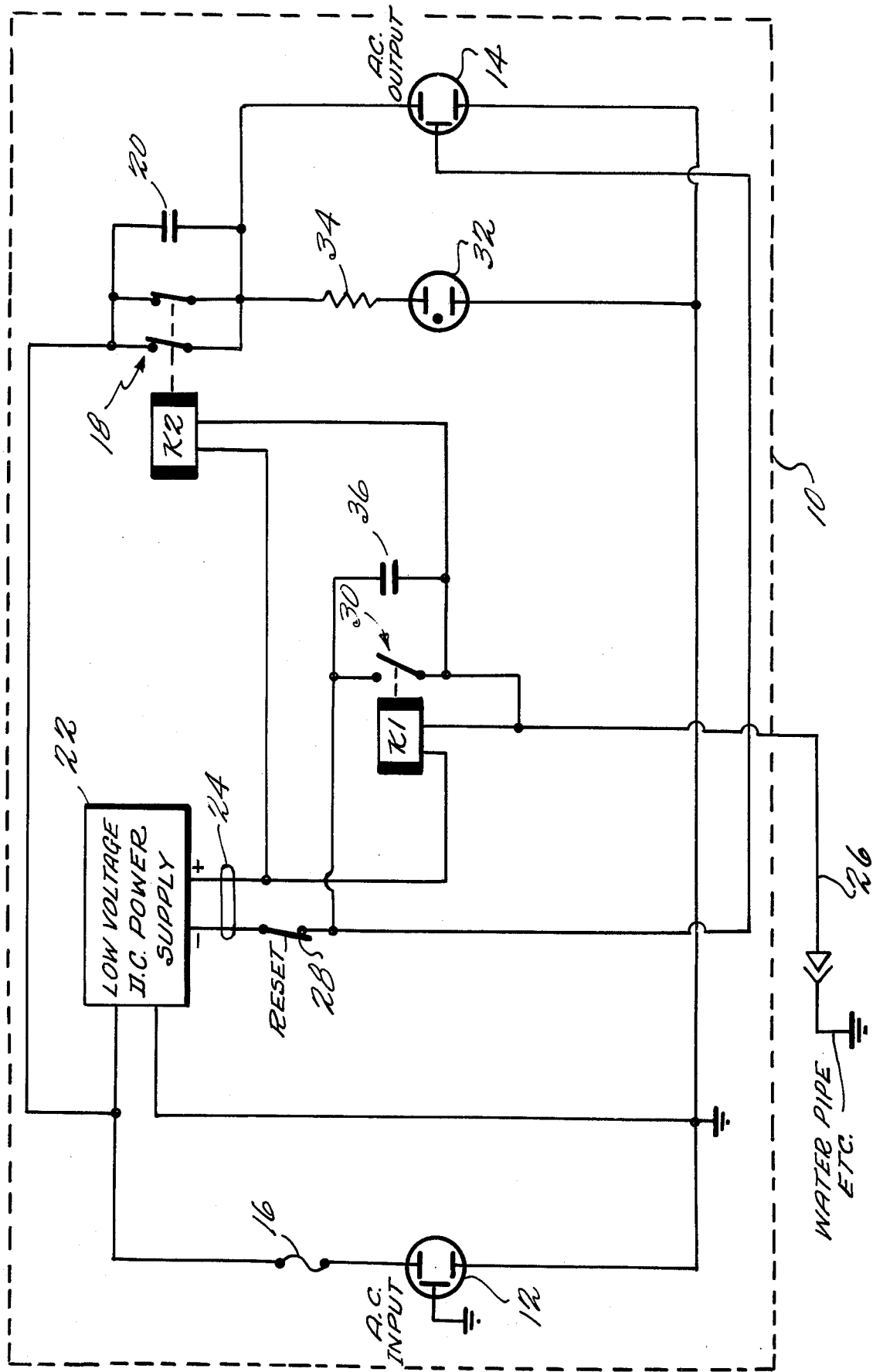

POWER INTERRUPTER FOR ELECTRICAL DEVICES

This invention generally relates to a power interrupter for automatically interrupting the power supply and thus stopping electrical devices such as drills, saws, etc., when a working portion of such a device comes into contact with a grounded metal object such as a water pipe or electrical conduit, etc. Other applications for this invention may also be apparent from the following description.

It is often difficult for a workman to know exactly where water pipes or electrical conduits are located within a pre-existing structure. At the same time, it is often necessary for a workman to saw, drill, etc., through such pre-existing structures for the purposes of modification, installation of new equipment or for other reasons as will be apparent. When such operations are performed it is thus quite possible that a water pipe or electrical conduit or other grounded metal objects may be unwittingly damaged. Beyond the immediate damage to the grounded metal object per se, there is often an even greater potential for secondary damage such as by flooding when a water pipe is accidentally severed. Of course, there are also safety factors involved when drilling into electrical conduits. In general, past experience has shown that accidental contact with grounded metal objects such as water pipes, electrical conduits, refrigeration pipe lines, etc., have resulted in bodily injury, electrical fires, flooding, and other forms of damage as will be appreciated.

Accordingly, there have been many past attempts to provide a power interruption device for automatically stopping an electrical tool such as a drill, saw, etc., as soon as it comes into contact with such a grounded metal object and before extensive damage is caused. Nevertheless, in spite of such long felt need and the numerous prior attempts to meet such need, there is still no satisfactory reliable device available on the market at a suitable price. Many earlier attempts to meet this need have involved electrical circuitry using semiconductor devices such as diac, triac, or SCR devices. Some others have attempted to utilize AC relays. However, the result has been unreliable devices which may not operate in time to prevent damage under certain circumstances where only a very low ground fault current is caused to flow and/or units which become almost totally inoperative after a short period of operation due to excessive arcing of relay contacts, etc.

Thus, there is still a definite need for a reliable power interrupter device at a reasonable price for workmen and businessmen who regularly have reason to operate in unfamiliar and/or unknown structural environments. The liability insurance premiums for such operations are still tremendously high due to the absence of a reliable and effective power interrupter device, in part.

Since the prior attempts to provide a suitable power interrupter device have not held up under normal usage, many workmen and businessmen having a need therefor have stopped using them because erratic operation is sometimes worse than no protection at all if it induces a false sense of security and thus actually increases the risk factor rather than decreases it.

Now, however, I have discovered circuitry which provides a highly reliable low-cost power interrupter for such electrical devices. This interrupter uses a low voltage DC power supply for the sensing circuit and the detector is actually a current sensitive DC relay having its coil in series with the power supply, a known ground connection and the working portion of the electrical tool connected to the power interrupter. Whenever the working portion of such tool comes into contact with an electrical ground potential (e.g., a grounded metal object), a circuit is completed such that a small amount of DC current flows through a current sensitive relay thus actuating this relay which, in turn, actuates a power relay for interrupting the power supply to the electrical device connected thereto.

In the preferred exemplary embodiment, the current sensitive relay also includes a latching circuit such that the power interruption is maintained once the current sensitive relay is tripped into operation. A reset switch is also provided in the preferred embodiment for releasing the latching circuit upon actuation of the reset switch.

The preferred exemplary embodiment also includes arc suppression capacitors across the relay contacts thus minimizing unnecessary arc damage thereto.

Other features, objects and advantages of this invention will become more readily apparent from the following detailed description of the invention taken in conjunction with the accompanying drawing which is a schematic of the electrical circuitry utilized in the presently preferred exemplary embodiment of this invention.

Referring to the accompanying drawing, a presently preferred exemplary embodiment of this invention is shown. The circuitry may be separately housed in a conventional chassis 10 or, alternatively, the circuitry may be incorporated with the electrical device to be protected thereby. As should be apparent, in this latter instance, the AC output connections would be made directly to the motor windings or other electrical inputs of the device rather than via separate external electrical connector as in the presently preferred exemplary embodiment.

The AC input is via connector 12 which, in the exemplary embodiment, would comprise a conventional three terminal male plug while the AC output terminal 14 would, in the present exemplary embodiment, comprise a conventional three terminal female receptacle. A fuse 16 is provided for conventional protection against short circuits.

It will be seen from the drawing that the electrical contacts 18 of relay K2 (actually comprising a pair of contacts connected in parallel) is serially connected between the AC input 12 and the AC output 14. The contacts 18 are normally closed as shown in the drawing such that electrical power is normally supplied from the AC input to the AC output. An arc suppression capacitor 20 is also connected across the electrical contacts 18 because the anticipated load (e.g., a drill, saw, etc.,) will be an inductive load which tends to produce an arc on the relay contacts whenever the power is abruptly interrupted thereat. This arc suppression capacitor in combination with the use of conservatively rated (typically 10 amps, 120 volts AC) relay contacts (especially when connected in parallel as in the exemplary embodiment) provides an extremely reliable and long lasting switching arrangement. The AC input from plug 12 is also connected across the input of a low voltage DC power supply 22 which provides a low voltage (6–12 volts) DC output on leads 24 for actuating relays. The sensing detector is actually the relay coil of relay K1 which, as shown in the drawing, is serially connected with a known ground potential via lead 26, the low voltage DC output on leads 24 and the third "ground" terminal of the AC output plugs are receptacle 14. This series connection also passes through a reset switch 28 which is included for purposes that will be described below.

The working portion of most electrical devices is grounded to the main frame of the device which, in turn, is connected to the third terminal of the power cord plug (e.g., ground wire). Accordingly, the third terminal of the AC output plug 14 will normally be connected to the working portion of the electrical device connected thereto. Thus, whenever the working portion (e.g., a drill bit) touches a grounded metal object (e.g., water pipe), a series circuit is completed through the current sensitive DC relay K1 which permits a small DC current (approximately 5–10 milliamperes) to flow in the K1 coil. This is sufficient current to actuate the normally open contacts 30 of relay K1 which then connects the coil of relay K1 in a latching circuit across the output of the low voltage DC power supply 22 as will be apparent from the drawing. Accordingly, once relay K1 is actuated by a small flow of DC current when the working portion of the protected tool comes into contact with the grounded metal object, it stays latched in this condition until the latching circuit is interruped by momentary opening of reset switch 28 thus readying the apparatus for another cycle of operation.

It will also be observed that the coil of relay K2 is also connected in parallel with relay coil K1. Accordingly, when the self-latching circuit of relay K1 is actuated, this also connects the coil of relay K2 across the low voltage DC power supply 22 output thus actuating the electrical contacts 18 and opening them to thus interrupt the flow of power to the AC output receptacle 14. In this manner, the electrical drill, saw, etc., is automatically stopped before damage occurs.

The neon bulb 32 and current limiting series resistor 34 are connected across the AC output receptacle 14 to provide a visual indication whenever a power is actually being supplied to the AC output receptacle 14.

An arc suppression capacitor 36 is provided across contacts 30 to minimize arcing thereat when the relay latching circuit is reset.

As shown in the presently preferred exemplary embodiment, lead 26 is a separate external lead-wire with an alligator clip or the like for connection to a nearby water pipe or other source of known ground electrical potential. However, as will be appreciated by those in the art, the lead 26 could be internally connected to the third terminal of the AC input plug 12 if it is known that this third terminal will actually be connected to a three terminal grounded supply receptacle as intended. Nevertheless, the safest and most reliable procedure is to provide the separate external lead-wire 26 for actual physical and electrical connection to a known source of ground electrical potential.

Since low DC voltages and currents are utilized for activating the power interrupter, no harmful voltage or current is exposed to the user thus making it safe for use and free of shock hazards. In addition, it will be recognized that the normal safety function of the grounded electrical tool casing is not significantly impaired since such casing will only be maintained a very few volts above ground potential and since the "hot" side of the electrical supply is automatically interrupted the moment even small DC currents begin to flow in any ground fault.

Although only one specific circuitry has been shown for the presently preferred exemplary embodiment, those in the art will recognize that various changes and modifications may be made in the exemplary embodiment without materially departing from the novel and substantial improvements offered by this invention. Accordingly, all such changes and modifications are intended to be included within the scope of this invention as defined by the appended claims.

What is claimed is:

1. A power interrupter for normally supplying electrical power from a power source to an electrical device having a working portion which may contact a grounded metal object during its operation and for automatically interrupting such power supply to the device whenever the working portion actually does contact a grounded metal object, said power interrupter comprising:

input connector means for electrical connection to said power source, first relay means including first electrical contacts and a first actuating coil having first and second states of actuation for moving said first contacts, output connector means for electrical connection to said electrical device including an electrical connection to said working portion, said first electrical contacts being connected in series between said input connector means and said output connector means for normally supplying electrical power to said electrical device when said first actuating coil is in its first state of actuation and for interrupting said supply of power when said first actuating coil is in its second state of actuation, a power supply means connected to receive electrical power from said input connector means and having first and second output leads for supplying relay actuating electrical energy, a second relay means including second electrical contacts and a second actuating coil having first and second states of actuation as a function of electrical current passing therethrough for moving said second contacts, ground connector means for establishing an electrical ground potential, said second actuating coil being connected in series with said electrical connection to said working portion, said first and second output leads from the power supply means and said ground connector means whereby a circuit is completed through said second actuating coil for the flow of said relay actuating electrical energy whenever said working portion actually does contact a grounded metal object, and said first actuating coil being connected in circuit with said second electrical contacts whereby it is caused to change to its second state of actuation thereby interrupting said supply of electrical power to the device whenever said working portion actually does contact a grounded metal object.

2. A power interrupter as in claim 1 further comprising an arc suppression capacitor connected across said first electrical contacts.

3. A power interrupter as in claim 1 wherein said power supply means provides a direct current low voltage output on said first and second output leads.

4. A power interrupter as in claim 1 wherein said second electrical contacts are connected in a latching circuit with said second actuating coil so as to automatically maintain the interruption of power to said electrical device once its working portion has actually contacted a grounded metal object.

5. A power interrupter as in claim 4 further comprising a reset switch connected in circuit with said latching circuit for releasing same from its latched state when said reset switch is actuated.

6. A power interrupter as in claim 1 further comprising an arc suppression capacitor connected across said first electrical contacts and another arc suppression capacitor connected across said second electrical contacts.

7. A power interrupter as in claim 1 wherein said first electrical contacts comprise a pair of contacts electrically connected in parallel.

8. A power interrupter as in claim 1 further comprising an indicator means electrically connected with said output connector means for indicating whether electrical power is being supplied thereto.

9. A power interrupter as in claim 1 wherein:
said input connector means comprises a three-wire male AC plug, and
said output connector means comprises a three-wire female AC plug.

10. A power interrupter as in claim 1 wherein said first actuating coil and said second actuating coil are electrically connected in parallel.

* * * * *